(12) United States Patent
Firpo et al.

(10) Patent No.: US 10,708,429 B2
(45) Date of Patent: Jul. 7, 2020

(54) CALL MANAGEMENT SYSTEM FOR A DISPATCH CENTER

(71) Applicant: MOTOROLA SOLUTIONS, INC., Chicago, IL (US)

(72) Inventors: Isabel Firpo, Chicago, IL (US); Doris E. Ford, Arvada, CO (US); Parveen Gupta, Centennial, CO (US); Jill M. Hillman, Westminster, CO (US); Vinayak Reddy, Thornton, CO (US); Marcus P. Snyder, Estes Park, CO (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 43 days.

(21) Appl. No.: 16/054,250

(22) Filed: Aug. 3, 2018

(65) Prior Publication Data
US 2020/0045179 A1   Feb. 6, 2020

(51) Int. Cl.
| H04M 3/523 | (2006.01) |
| H04M 3/22  | (2006.01) |
| H04M 3/436 | (2006.01) |
| H04M 3/51  | (2006.01) |

(52) U.S. Cl.
CPC ....... *H04M 3/5232* (2013.01); *H04M 3/2227* (2013.01); *H04M 3/436* (2013.01); *H04M 3/5116* (2013.01)

(58) Field of Classification Search
CPC .. H04M 3/523; H04M 3/5116; H04M 3/2227; H04M 3/436

USPC ........... 379/265.02, 265.01, 265.05, 265.08, 379/265.11, 266.01, 266.03, 266.06, 379/266.08
See application file for complete search history.

(56) References Cited

U.S. PATENT DOCUMENTS

| 5,546,456 A | 8/1996 | Vilsoet et al. |
| 5,828,747 A | 10/1998 | Fisher et al. |
| 6,163,607 A | 12/2000 | Bogart et al. |
| 6,714,643 B1 | 3/2004 | Gargeya et al. |
| 7,542,561 B1 * | 6/2009 | Jabbour .............. H04M 3/5232 379/265.01 |

(Continued)

FOREIGN PATENT DOCUMENTS

WO   99/13635 A1   3/1999

OTHER PUBLICATIONS

International Search Report and Written Opinion dated Oct. 5, 2019 for corresponding International Application No. PCT/US2019/044411 (pp. 14).

*Primary Examiner* — Thjuan K Addy
(74) *Attorney, Agent, or Firm* — Michael Best & Friedrich LLP

(57) ABSTRACT

Methods and systems for improving a call queue at a dispatch center. One system includes an electronic computing device communicatively coupled to a first call workstation and a second call workstation. The electronic computing device includes an electronic processor configured to receive a first call, direct the first call to the first call workstation, analyze the first call for a key incident factor, calculate a first estimated call length based on the key incident factor, and determine, based on the first estimated call length, whether to assign a queued call, received at the electronic computing device after the first call, to the first call workstation or to the second call workstation.

18 Claims, 4 Drawing Sheets

(56) References Cited

U.S. PATENT DOCUMENTS

| | | | |
|---|---|---|---|
| 2005/0129214 A1* | 6/2005 | Tyagarajan | H04M 3/5234 |
| | | | 379/265.04 |
| 2007/0025541 A1 | 2/2007 | Mohler | |
| 2008/0310398 A1 | 12/2008 | Jain et al. | |
| 2014/0023186 A1* | 1/2014 | Srinivas | H04M 3/5232 |
| | | | 379/266.01 |
| 2014/0094134 A1 | 4/2014 | Balthasar et al. | |

* cited by examiner

CALL MANAGEMENT SYSTEM FOR A DISPATCH CENTER

BACKGROUND OF THE INVENTION

Law enforcement and other public safety personnel respond to incidents in the course of their duties. Responding to incidents often involves collecting myriad pieces of information (for example, police reports, evidence, witness reports, video and other media assets, and the like) related to the incident response from numerous callers. During the occurrence of one or more incidents, the number of calls received at a public safety command center may increase. Public safety call handlers at the command center may not be able to handle the calls efficiently by themselves.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
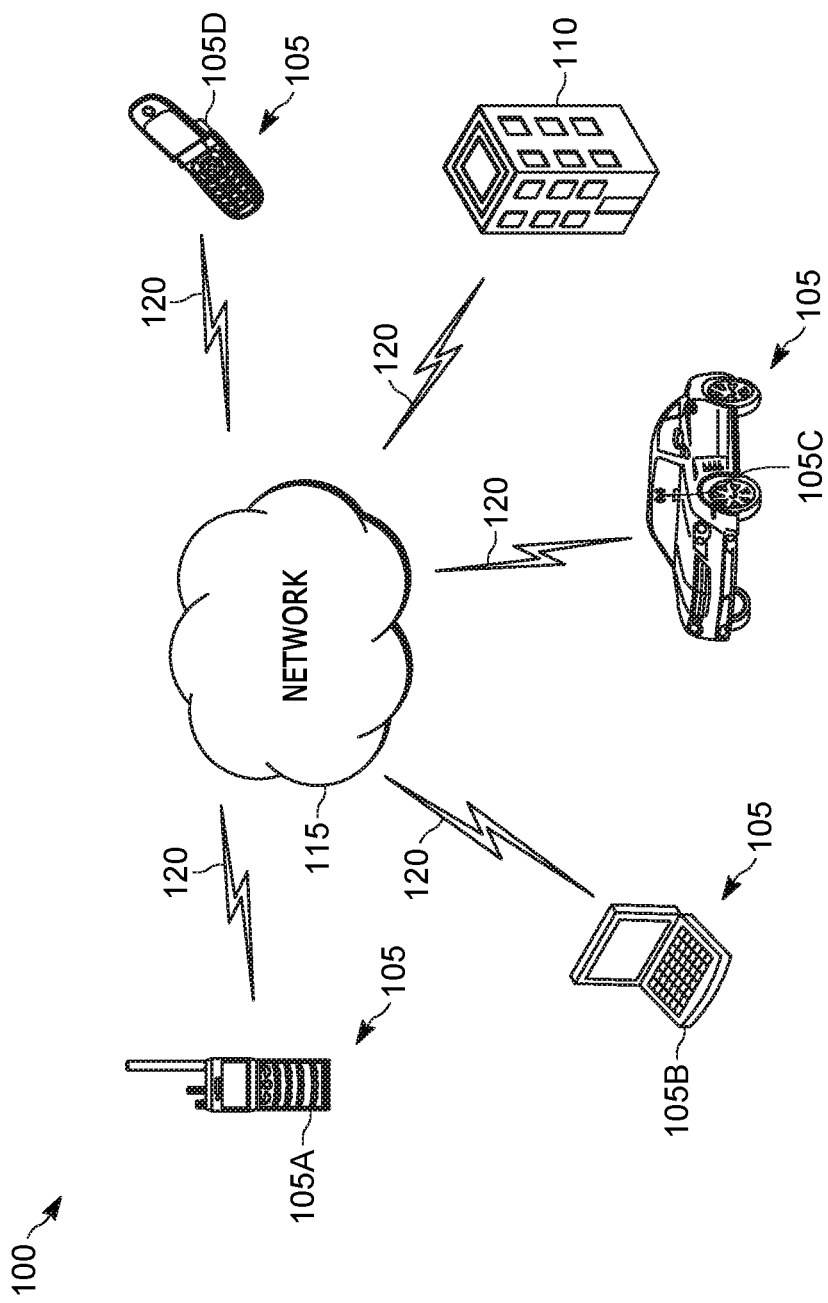
FIG. 1 is a block diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One or more devices such as tablets, laptop computers, desktop computers, telephones (for example, cellular, landline, or satellite), devices with an interactive display, and other communication devices may be a part of a console operated by a call handler such as a public safety dispatcher. In some embodiments, the console of a call handler presents one or more received data feeds to the call handler via an output device. For example, content of a voice call is presented audibly via a speaker of the console. In other words, the console allows the call handler to participate in voice calls with a citizen or an officer. However, in some situations, the console may only allow the call handler to participate in a voice call with one other device at a time. This situation may be problematic when multiple callers are calling about the same incident, but the calls are queued due to lack of availability of call handlers and/or the length of one or more calls is longer than average. For example, a second caller whose call is placed in a queue of a first call handler may be able to provide more reliable and/or more relevant information to a call handler about an incident but is unable to do so because the first call handler is unavailable while participating in a voice call with a first caller. The call of the second caller may be stuck in the queue for at least as long as it takes for the current call the first call handler is handling to complete. Meanwhile, a call being handled by a second call handler may complete before the call at the first call handler does, making the second call handler available for another call while the second caller is still waiting for the first call handler to become available. Thus, there is a technological problem with respect to the communication between a call handler and people reporting incident information to the call handler, namely, that many systems are poorly adapted to monitor and determine call handler availability and distribute queued calls to call handlers who are available.

Disclosed are, among other things, a method, device, and system for one or more electronic processors to handle calls between a communication device of a call handler (for example, a console) and a plurality of network-connectable devices of callers (for example, smart telephones, tablets, portable radios, and the like). In some embodiments, the one or more electronic processors direct a queued call of a first call handler to a second call handler in response to determining that a call currently being handled by the first call handler may be longer than a call being handled by the second call handler.

Certain examples of the disclosed method, device, and system solve the above-noted technological problem by improving communication between a call handler and people reporting incident information to the call handler by determining which call handler to direct the call so that the caller is connected to a call handler sooner. Additionally, the disclosed method, device, and system may reduce the size of a queue of callers contacting a public safety agency by allocating queued calls to the assumed next available call handler so that they are handled quickly.

The console (referred to herein as a call workstation) may be operated by a public safety call handler (for example, an emergency call taker or an incident-handling dispatcher). In some situations, a public safety command center includes one or more consoles each operated by a different call handler. In some situations, the call handlers include emergency call-takers and incident-handling dispatchers. In some embodiments, an emergency call-taker is a person who analyzes a received data feed (for example, voice call, live or recorded video feed, text message, and the like) from a citizen. The emergency call-taker may also analyze the received data feed via a console, identify an incident based on the data feed, and decide how to respond to the data feed to help the citizen and handle the incident. For example, the emergency call-taker may transfer the data feed to a different agency (for example, animal control), take no action (for example, when the data feed is a prank call or an accidental call), transfer the data feed to the console of an incident-handling dispatcher, and the like.

In some situations, a console of an incident-handling dispatcher receives one or more data feeds from citizens or others in response to an emergency call-taker using a console to transfer the one or more data feeds to the console of the incident-handling dispatcher. In some situations, the incident-handling dispatcher is temporarily assigned to an incident in which officers are supervising, maintaining, providing assistance, and the like (for example, a concert, a sporting event, management of a theme park or other entertainment venue, and the like). In some embodiments, the incident is an event, occurrence, or situation in which officers are involved. In some embodiments, the incident is a public safety incident in which public safety officers are called to a location to provide assistance in resolving or preventing a societal or environmental problem (for example, a location where a suspect is committing or has committed a crime, a fire, a vehicular accident, a traffic stop, and the like).

In some embodiments, the console of the call handler additionally or alternatively receives one or more data feeds from devices of officers handling the incident. In some embodiments, officers are personnel acting on behalf of a dispatching, supervising, or responsible agency/entity (for example, employees of a theme park; security guards at a concert or sporting event; public safety officers such as police officers, firefighters, and paramedics; and the like). As an example of the console receiving data feeds from devices of officers, the console receives an audio feed (for example, a voice call) from a portable radio. As another example, the console receives a video feed or an image feed from one or more of a camera of a network-connectable device such as a smart telephone, a dash camera of a vehicle, and a body-worn camera of an officer. As another example, the console receives a data feed from a biometric sensor that monitors biometric data of an officer or from an alarm system that monitors a building (for example, a fire alarm, a toxic gas alarm, and the like). In some embodiments, the console receives a data feed from a device that is not operated by a citizen or an officer such as one or more of a security camera, a traffic camera, and the like.

One embodiment provides system for call queue improvement. The system includes an electronic computing device communicatively coupled to a first call workstation and a second call workstation. The electronic computing device includes an electronic processor configured to receive a first call, direct the first call to the first call workstation, analyze the first call for a key incident factor, calculate a first estimated call length based on the key incident factor, and determine, based on the first estimated call length, whether to assign a queued call, received at the electronic computing device after the first call, to the first call workstation or to the second call workstation.

Another embodiment provides an electronic computing device for call queue improvement. The device includes an electronic processor configured to receive a first call, direct the first call to a first call workstation, analyze the first call for a key incident factor, calculate a first estimated call length based on the key incident factor, and determine, based on the first estimated call length, whether to assign a queued call, received at the electronic computing device after the first call, to the first call workstation or to a second call workstation.

Another embodiment provides a method for improving a call queue at a dispatch center. The method includes receiving, at an electronic computing device, a first call, directing the first call to a first call workstation, analyzing, via an electronic processor of the electronic computing device, the first call for a key incident factor, calculating, via the electronic processor, a first estimated call length based on the key incident factor, and determining, via the electronic processor and based on the first estimated call length, whether to assign a queued call, received at the electronic computing device after the first call, to the first call workstation or to a second call workstation.

FIG. 1 is a block diagram of a communication system 100 according to one example embodiment. The communication system 100 includes various network-connectable devices 105A through 105D. In the following description, when explaining how a single network-connectable device functions, a reference to network-connectable device 105 is used. As indicated by FIG. 1, the network-connectable device 105 may be any one of a number of different types of network-connectable devices. For example, network-connectable device 105A is a portable communication device carried by an officer during patrol (for example, an employee of a theme park; a security guard at a concert or sporting event; a public safety officer such as police officer, firefighter, and paramedic; and the like). In some embodiments, network-connectable device 105A is a smart telephone, a battery powered portable radio, a body wearable camera, a biometric sensor, or similar device. As another example, network-connectable device 105B is a laptop computer that can receive input from a user via a keyboard, a touchscreen display, a microphone (for example, voice commands), and the like. In other embodiments, network-connectable device 105B is a tablet, a desktop computer, or a similar device. As another example, network-connectable device 105C is a vehicular mobile communication device (for example, a device built into a police vehicle, a fire truck, an ambulance, a maintenance vehicle such as a tow truck, and the like). Network-connectable device 105C may include, but is not limited to, a dashboard camera, a microphone, a laptop, and the like. As yet another example, network-connectable device 105D is a smart telephone operated by a civilian. Network-connectable device 105D may be any type of network-connectable device (for example, a laptop, desktop computer, tablet, smart watch, and the like).

The types of network-connectable devices 105A through 105D described above and shown in FIG. 1 are merely examples. In other embodiments, the communication system 100 includes other types of network-connectable devices. For example, a network-connectable device 105 is an alarm system that monitors a building (for example, a fire alarm, a toxic gas alarm, and the like). In some embodiments, one or more network-connectable devices 105 are not operated by a citizen or an officer such as one or more of a security camera, a traffic camera, and the like. In some embodiments, the communication system 100 includes more or fewer network-connectable devices 105 than the number of network-connectable devices 105 shown in FIG. 1.

As shown in FIG. 1, the communication system 100 also includes a command center 110. For example, the command center 110 is a security management office at a theme park or a public safety command center such as a police headquarters, fire station, dispatch center, public safety answering point (PSAP), operations center, command and control facility, and the like. In some embodiments, the command center 110 includes one or more network-connectable devices 105 that are part of the communication system 100 as explained below with respect to FIG. 2. In the following description, when explaining communication to or from the command center 110, it should be understood that such communication is occurring to or from one or more of the network-connectable devices 105 included in the command center 110.

As indicated in FIG. 1, the network-connectable devices 105A through 105D and the command center 110 may communicate with each other over a network 115 over respective wireless links 120 and via corresponding network interfaces including one or more transceiver circuits (for example, by sending and receiving radio signals). The network 115 may include wireless and wired portions. All or parts of the network 115 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks. In some embodiments, the network 115 may also include a combination of the networks mentioned.

Also as shown in FIG. 1, in some embodiments, the network-connectable devices 105A through 105D and the command center 110 may communicate directly with each other via direct-mode wireless link(s) 125 using a communication channel or connection that is outside of the network 115. For example, the network-connectable devices 105A through 105D and the command center 110 communicate directly with each other when they are within a predetermined distance from each other. Although FIG. 1 only shows direct-mode wireless links 125 between adjacent network-connectable devices 105, in some embodiments, any one of the network-connectable devices 105 and the command center 110 is capable of communicating with another network-connectable device 105 or the command center 110 via a direct-mode wireless link 125.

Figure 2:
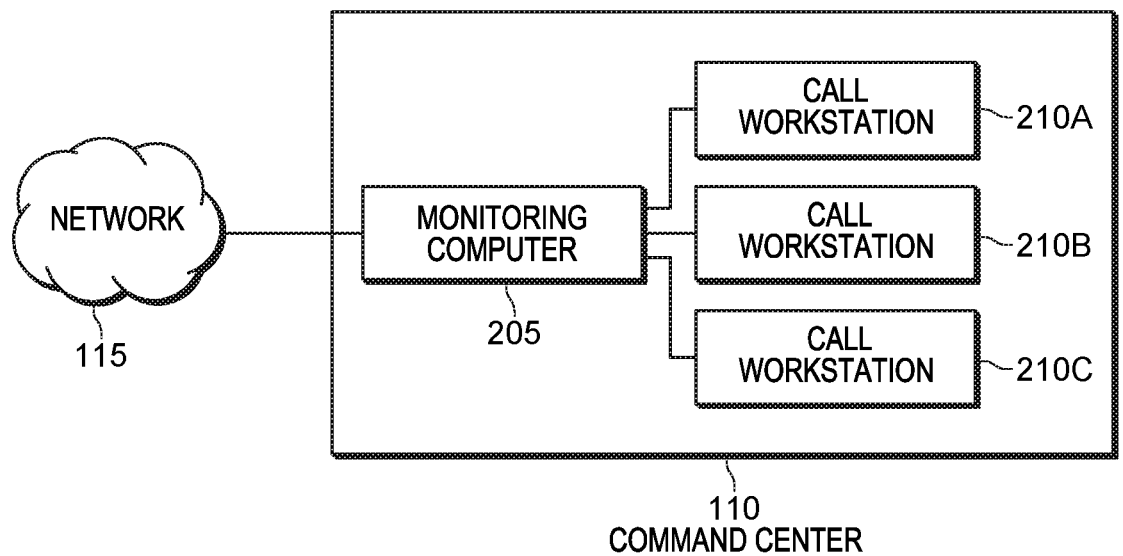
FIG. 2 is a block diagram of a command center included in the communication system of FIG. 1 according to one example embodiment.

FIG. 2 is a block diagram of the command center 110 according to one example embodiment. In some embodiments, the command center 110 includes a monitoring computer 205 and a plurality of call workstations 210A through 210C. In the following description, when explaining how a single workstation functions, a reference to workstation 210 is used. The workstations 210 are consoles that are each operated by a separate call handler (for example, public safety consoles each operated by a separate incident-handling dispatcher as explained above). In some embodiments, the monitoring computer 205 is communicatively coupled to the network 115 and to the workstations 210A through 210C via wired connections, wireless connections, or a combination thereof. As explained in greater detail below, the monitoring computer 205 is configured to receive one or more data feeds from one or more network-connectable devices 105 over the network 115. In some embodiments, the monitoring computer 205 is configured to control which received data feeds are provided to which workstations 210. In some embodiments, the workstations 210 are configured to communicate through the monitoring computer 205 to one or more network-connectable devices 105 over the network 115.

Although the workstations 210 are described as being located at the command center 110, in some embodiments, the workstations 210 are portable devices such as the network-connectable devices 105 described above. Additionally, the terms "network-connectable device" and "communication device" are used throughout this specification to explain example use situations. However, a single device, for example, a mobile telephone of a public safety officer, may be considered a network-connectable device 105 in one situation and may be considered a call workstation 210 in another situation.

While FIG. 2 shows the workstations 210 and the monitoring computer 205 as separate devices, in some embodiments, the workstations 210 are integrated into the monitoring computer 205 and directly controlled by the monitoring computer 205. In other embodiments, the command center 110 may not include a separate monitoring computer 205 and the functionality of the monitoring computer 205 described below may be integrated into each of the workstations 210. In some embodiments, the monitoring computer 205 includes more or fewer workstations 210 than the number of workstations 210 shown in FIG. 2.

The monitoring computer 205 maintains a queue of data feeds received from network-connectable devices 105 that are intended for the command center 110. For example, when all call handlers (for example, emergency call-takers and incident-handling dispatchers) are currently handling other data feeds (for example, other voice calls), the monitoring computer 205 queues later-received data feeds in the order that they are received. When a call handler becomes available, the monitoring computer 205 routes a data feed in the queue to the newly-available call handler. As described in more detail below, the monitoring computer 205 may assign a queued data feed to a queue of a particular workstation 210. In some embodiments, the monitoring computer 205 obtains information from one or more data feeds in the queue. For example, a data feed in the queue includes metadata that indicates a location from where the data feed was received, a time stamp at which the data feed was captured or transmitted, an identifier that identifies a user of the network-connectable device 105 that transmitted the data feed, and the like. As another example, when the data feed is a text feed (for example, a text message) or a biometric sensor data feed, the monitoring computer 205 analyzes the data feed while the data feed is in the queue. As another example, the monitoring computer 205 provides an automated questionnaire to a network-connectable device 105 providing a data feed (for example, a voice call) that is waiting in the queue as explained in further detail below. In response to the automated questionnaire, the monitoring computer 205 receives information about the queued data feed from a user of the network-connectable device 105 providing the queued data feed. In some embodiments, the monitoring computer 205 determines additional information from the received information from the user of the queued network-connectable device 105 as explained in greater detail below (for example, incident type information based on keyword data).

Figure 3:
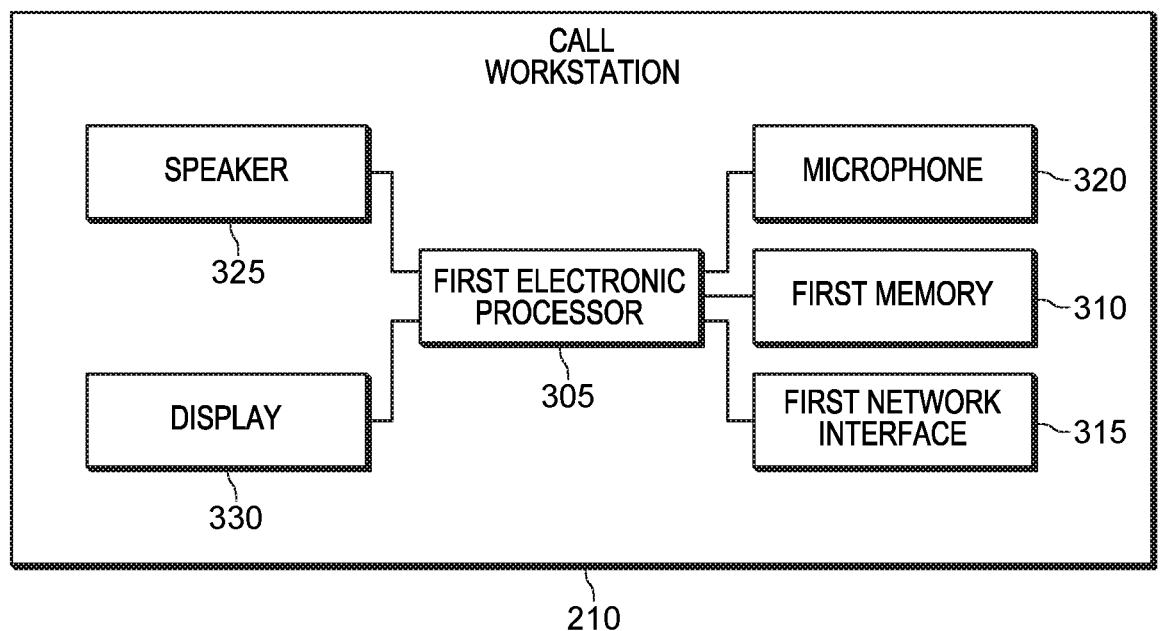
FIG. 3 is a block diagram of a workstation included in the command center of FIG. 2 according to one example embodiment.

FIG. 3 is a block diagram of a workstation 210 according to one example embodiment. In the embodiment illustrated, the workstation 210 includes a first electronic processor 305 (for example, a microprocessor or other electronic device). The first electronic processor 305 includes input and output interfaces (not shown) and is electrically coupled to a first memory 310, a first network interface 315, a microphone 320, a speaker 325, and a display 330. In some embodiments, the workstation 210 includes fewer or additional components in configurations different from that illustrated in FIG. 3. For example, the workstation 210 may additionally include a push-to-talk button or a camera. As another example, the workstation 210 may include one or more additional input devices such as a computer mouse and/or a keyboard that receive inputs from a user of the workstation 210. In some embodiments, the workstation 210 performs functionality other than the functionality described below.

The first memory 310 may include read only memory (ROM), random access memory (RAM), other non-transitory computer-readable media, or a combination thereof.

The first electronic processor 305 is configured to receive instructions and data from the first memory 310 and execute, among other things, the instructions. In particular, the first electronic processor 305 executes instructions stored in the first memory 310 to perform the methods described herein. In some embodiments, the first memory 310 is implemented on devices located at the command center 110, at a remote location, or at a remote cloud-computing cluster.

The first network interface 315 sends and receives data to and from the monitoring computer 205. In some embodiments, the first network interface 315 additionally or alternatively sends and receives data to and from the network 115 without the data first passing through a separate monitoring computer 205. In some embodiments, the first network interface 315 includes one or more transceivers for wirelessly communicating with the monitoring computer 205 and/or the network 115. Alternatively or in addition, the first network interface 315 may include a connector or port for receiving a wired connection to the monitoring computer 205 and/or the network 115, such as an Ethernet cable. The first electronic processor 305 may receive one or more data feeds (for example, a video feed, an audio feed, an image feed, a text feed, a sensor input data feed, and the like) over the network 115 through the first network interface 315 (for example, data feeds generated by one or more network-connectable devices 105 and transmitted over the network 115). In some embodiments, the first electronic processor 305 receives data through the first network interface 315 directly from a network-connectable device 105. In some embodiments, communication of data feeds may occur in approximately real-time. The first electronic processor 305 may communicate data generated by the workstation 210 over the network 115 through the first network interface 315, such as for receipt by one or more network-connectable devices 105. For example, the first electronic processor 305 receives electrical signals representing sound from the microphone 320 and may communicate information relating to the electrical signals over the network 115 through the first network interface 315 to other devices, for example, to one or more network-connectable devices 105. Similarly, the first electronic processor 305 may output the one or more data feeds received from the network 115 through the first network interface 315, for example from a network-connectable device 105, through the speaker 325, the display 330, or a combination thereof. For example, the workstation 210 engages in a voice call with a network-connectable device 105 over the network 115.

The display 330 displays images, video, text, and/or data from sensor inputs to the user (for example, a call handler). The display 330 may be a liquid crystal display (LCD) screen or an organic light emitting display (OLED) display screen. In some embodiments, a touch sensitive input interface may be incorporated into the display 330 as well, allowing the user to interact with content provided on the display 330. In some embodiments, the display 330 includes a projector or future-developed display technologies. In some embodiments, the speaker 325 and the display 330 are referred to as output devices that present data feeds to a user of the workstation 210 (for example, a call handler). In some embodiments, the microphone 320, a computer mouse, and/or a keyboard or a touch-sensitive display are referred to as input devices that receive input from a user of the workstation 210.

In some embodiments, the network-connectable devices 105 include similar components as those shown in FIG. 3 with respect to the workstation 210. In some embodiments, the network-connectable devices 105 include fewer or additional components in configurations different from that illustrated in FIG. 3. For example, a network-connectable device 105 may also include one or more of a push-to-talk button to initiate voice communication over the network 115 (for example, an audio feed), a camera to capture a video feed and/or an image feed to be transmitted over the network 115, and a location component (for example, a global positioning system receiver) configured to determine the geographic coordinates of the location of the network-connectable device 105. In some embodiments, the network-connectable devices 105 transmit their respective location coordinates over the network 115 when transmitting data feeds to the command center 110 (for example, location information is stored as metadata associated with a data feed). Similarly, in some embodiments, the network-connectable devices 105 also include a time stamp when transmitting a data feed such that the command center 110 may determine a time of capture of the data feed or a time of transmission of the data feed. In some embodiments, the network-connectable devices 105 transmit a unique identifier of the network-connectable device 105 over the network 115 when transmitting data feeds to the command center 110 (for example, a unique identifier is stored as metadata associated with a data feed). In some embodiments, the network-connectable devices 105 transmit a text feed over the network 115 to the command center 110 (for example, a text message from a smart telephone, portable radio, or the like that includes alphanumeric and/or numeric data).

In some embodiments, a network-connectable device 105 may also include one or more sensors to generate data related to a user of the network-connectable device 105 and/or an environment of the network-connectable device 105. For example, the network-connectable device 105 may include a biometric sensor to monitor biometric data of a user (for example, a citizen, an officer such as a public safety officer, and the like) such as heart rate, breathing rate, body temperature, and the like. As another example, the network-connectable device 105 may include a pedometer, a sensor-enabled holster to detect when a weapon has been removed from the holster, and/or a sensor that detects when the weapon has been discharged. As yet another example, the network-connectable device 105 may include one or more sensors that monitor an environment of the user such as temperature, humidity, air quality, ambient noise level, and the like. In some embodiments, a sensor itself is a network-connectable device 105 that may transmit a data feed over the network 115 to, for example, the command center 110. However, in some embodiments, one or more sensors are separate from a network-connectable device 105, and the separate sensors are not capable of directly communicating over the network 115. In such embodiments, the separate sensors (for example, a sensor-enabled holster) may communicate over the network 115 via a network-connectable device 105 (for example, a nearby smart telephone, portable radio, and the like). For example, such separate sensors form a personal area network (PAN) with the network-connectable device 105 via corresponding short-range PAN transceivers, which may be based on a Bluetooth, Zigbee, Bluetooth Low Energy, WiFi, Near Field Communication (NFC), Radio Frequency ID (RFID) or other short-range wireless protocol. In such embodiments, the combination of the network-connectable device 105 and associated separate sensors that communicate monitored data to the network-connectable device 105 may be referred to as a single network-connectable device 105. In some embodiments, the network-connectable devices 105 transmit one or more sensor input data feeds over the network 115 to the command center 110, for example, to be displayed on a workstation 210 of a call handler. In some embodiments, the network-connectable devices 105 transmit sensor input data feeds to the command center 110 as metadata included in a data feed. In some embodiments, the network-connectable devices 105 perform functionality other than the functionality described above.

Figure 4:
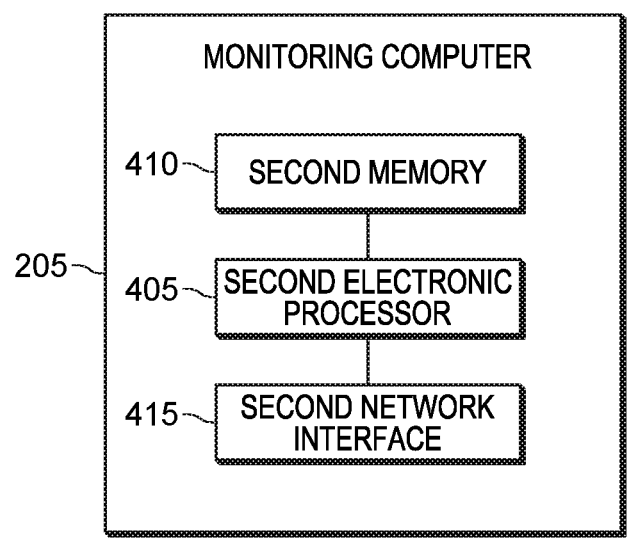
FIG. 4 is a block diagram of a monitoring computer included in the command center of FIG. 2 according to one example embodiment.

FIG. 4 is a block diagram of the monitoring computer 205 according to one example embodiment. In the example shown, the monitoring computer 205 includes a second electronic processor 405 electrically connected to a second memory 410 and a second network interface 415. These components are similar to the like-named components of the workstation 210 explained above with respect to FIG. 3 and function in a similar manner as described above. In some embodiments, the second network interface 415 sends and receives data to and from the network 115 and the workstations 210. In some embodiments, the monitoring computer 205 includes fewer or additional components in configurations different from that illustrated in FIG. 4. For example, the monitoring computer 205 may additionally include a display such as a touch screen to allow a user to reprogram settings of the methods described below. In some embodiments, the monitoring computer 205 performs functionality other than the functionality described below.

The monitoring computer 205 is configured to receive data feeds from network-connectable devices 105 operated by citizens (for example, smart telephones of citizens who have entered a user input to transmit one or more data feeds to a public safety command center 110 by, for example, dialing 9-1-1) and allocate or transmit the data feed(s) to one or more of the workstations 210 to be handled. Each workstation 210 is operated by a call handler that may be tasked with identifying a type of incident based on the one or more received data feeds from a network-connectable device 105. For example, the call handler may enter a user input (via a user input device) into the workstation 210 to identify an incident type and/or a location of the incident (for example, with a text document/incident record) based on a received voice call (for example, an audio feed) where a citizen describes the incident. In some embodiments, the call handler decides how to respond to the data feed to help the citizen and handle the incident. For example, the workstation 210 may receive a user input (via an input device) from the call handler to transfer the data feed to a different agency (for example, animal control), take no action (for example, when the data feed is a prank call or an accidental call), transfer the data feed to the monitoring computer 205 to be further transferred to the workstation 210 of an incident-handling dispatcher, and the like. The workstation 210 may transfer information corresponding to the incident type and the location of the incident that was identified by the call handler to the monitoring computer 205. In some embodiments, the workstation 210 also transfers information corresponding to which workstation 210 the data feed should be transmitted. For example, the workstation receives a user input from the call handler to transfer the data feed to the workstation 210A because one or more previously-received data feeds associated with the same incident were routed to the workstation 210A. In this example, the workstation 210A of the same call handler receives multiple data feeds relating to a single incident in which the call handler is monitoring and handling.

In some embodiments, the workstation 210 and/or the monitoring computer 205 determine how to respond to the data feed to help the citizen and handle the incident in an automated manner (for example, using one or more of voice analytics, video analytics, text analytics, and the like to take a predetermined action based on the received data feed). For example, the workstation 210, the monitoring computer 205, or a combination thereof may analyze metadata of a data feed or use an automated questionnaire to obtain information about a data feed from a user of a network-connectable device 105 as described in further detail below.

In some embodiments, the monitoring computer 205 receives data feeds from network-connectable devices 105 operated by officers such as public safety officers. For example, because the public safety officers are trained to identify and handle many different public safety incidents, it may not be necessary for an emergency call-taker to identify a type of incident or how to handle the incident when the data feed is received from a network-connectable device 105 of an officer. Rather, the network-connectable device 105 of a public safety officer may receive a user input from the officer indicating a type of incident (for example, by the officer entering a code that represents the incident type) and other information related to the incident (for example, location, number of victims, and the like). The network-connectable device 105 of the officer then transmits this information as well as any selected data feeds over the network 115 to the monitoring computer 205 to be transferred to a workstation 210 of the call handler that is handling the corresponding incident.

In some embodiments, data feeds are received from network-connectable devices 105 that include, for example, sensors and a camera, that are not operated by a citizen or an officer. For example, data feeds may be received from one or more of a security camera, a traffic camera, an alarm notification system that monitors one or more of a building, a park, a fence, a parking lot, and other geographical locations (for example, a fire alarm, a toxic gas alarm, and the like), and the like.

While FIGS. 3 and 4 show separate block diagrams of the workstation 210 and the monitoring computer 205, as noted above, in some embodiments, the workstations 210 and/or the emergency call-taking devices are integrated into the monitoring computer 205 and directly controlled by one or more electronic processors of the monitoring computer 205. In other embodiments, the functionality of the monitoring computer 205 may be integrated into each of the workstations 210 and/or the emergency call-taking devices. In some embodiments, the monitoring computer 205, the workstations 210, the emergency call-taking devices, and/or a combination thereof are referred to as an electronic computing device that performs the functionality described below. For example, the electronic computing device may be a single electronic processor (for example, the second electronic processor 405 of the monitoring computer 205) or a plurality of electronic processors located in the monitoring computer 205. In other embodiments, the electronic computing device includes multiple electronic processors distributed across different devices. For example, the electronic computing device is implemented on one or more of the first electronic processors 305 of the workstations 210, the second electronic processor 405 of the monitoring computer 205, and one or more electronic processors located in one or more devices located at the command center 110 (such as emergency call-taking devices), at a remote location, or at a remote cloud-computing cluster. In some embodiments, the electronic computing device is a network-connectable device 105 and an electronic processor of the network-connectable device 105 performs the functionality described below.

As explained above, a console (for example, the workstation 210) located at the command center 110 may receive one or more data feeds from citizens (for example, a voice call, a live or recorded video feed, a text message, and the like). The console may additionally or alternatively receive one or more data feeds from the officers handling the incident (for example, employees of a theme park; security guards at a concert or sporting event; public safety officers such as police officers, firefighters, and paramedics; and the like). For example, the console of the call handler receives an audio feed or a location tracking feed from a portable communication device of an officer. In some situations, the console is configured to receive multiple data feeds simultaneously. For example, the console (for example, a workstation 210) allows the call handler to engage in a voice call using the microphone 320 and the speaker 325 while presenting multiple biometric data sensor feeds and/or location data sensor feeds on the display 330 to be viewed by the call handler. As another example, the console receives multiple voice calls simultaneously and presents options on the display 330 to allow the call handler to select which voice call should be made active for communication between the call handler and a caller.

However, in some situations, the console may only allow the call handler to participate in a voice call with one other device at a time. This situation may be problematic when multiple callers are queued due to lack of availability of call handlers and are "stuck" in the queue of a first call handler handling a lengthy call while one or more other call handlers have finished or are soon to finish their current call. Thus, there is a technological problem with respect to the communication between a call handler and people reporting incident information to the call handler.

Figure 5:
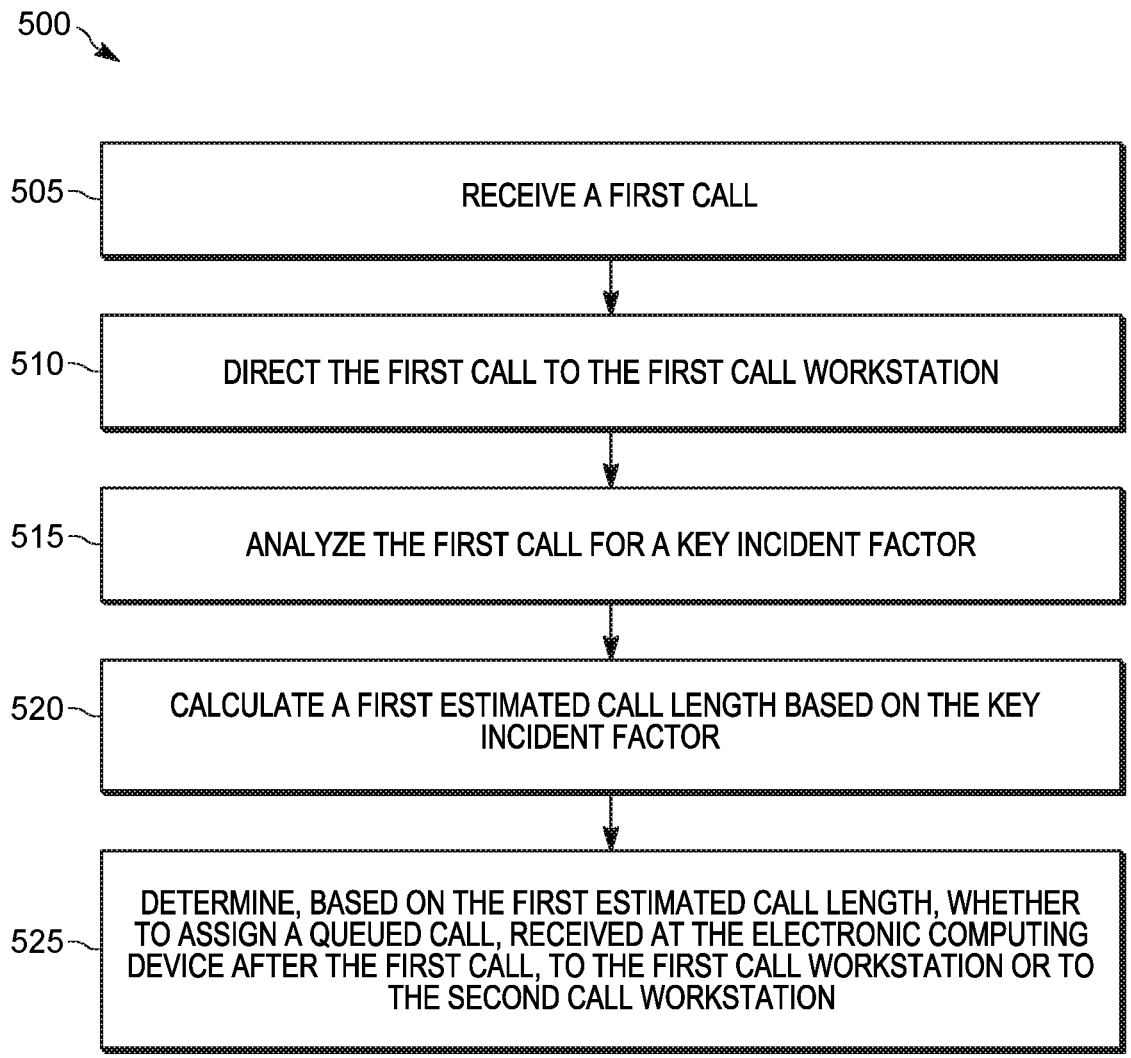
FIG. 5 is a flow chart of a method for improving a call queue of the command center of the communication system of FIG. 1 according to one example embodiment.

To solve this technological problem, the electronic computing device described above performs, in one instance, one or more of the methods explained below. For example, a method 500 of FIG. 5 is executed by the electronic computing device to determine an estimated call length of a call being handled at a first call workstation based on one or more key incident factors regarding the call and allocate one or more later received queued calls from one or more of the network-connectable device 105 of a caller to either the first call workstation or to another call workstation based on the estimated call length. It should be understood that while the method 500 is described below in terms of determining a single key incident factor, in some embodiments more than one key incident factor may be used in the determination of the estimated call length.

The method 500 solves the above-noted technological problem by improving communication between a call handler and people reporting incident information to the call handler by determining which call handler queue to allocate a queued call to so that the queued call may be handled by a call handler as soon as possible. As explained in more detail below, the electronic computing devices uses data from the network-connectable device 105 that the caller of the current call being handled by a call handler is using to determine an estimated call length. For example, the electronic computing device may use audio information from the caller and adjust the estimated call length based on key words detected in the audio (like an incident type). Additionally, the method 500 may reduce the size of a queue of callers contacting a public safety agency by more quickly allocating calls so that they are answered more immediately. Thus, the method 500 improves the speed and accuracy at which a command center may handle calls.

FIG. 5 illustrates a flow chart of the method 500 performed by the electronic computing device for improving a call queue of the command center 110. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure. As an example, the method 500 is described as being performed by the monitoring computer 205, in particular, in terms of the electronic processor 405. However, it should be understood that in some embodiments, portions of the method 500 are performed external to the monitoring computer 205 by other devices, including for example, one or more of the dispatch workstations 210 and the devices 105.

At block 505, the electronic computing device receives a first call from a network-connectable device 105 (for example, from a civilian calling about an incident). The call includes one or more data feeds over the first communication channel from the first network-connectable device 105. For example, the data feed includes an audio feed such as a voice call. In some embodiments, the first data feed is a video feed (for example, a video call) that includes both audio and visual data. In further embodiments, the call may include a text feed (for example, one or more text messages), and the like.

At block 510, the electronic computing device directs the first call to a first call workstation 210. In other words, the electronic computing device establishes a first communication channel between a workstation 210 of a call handler and the first network-connectable device 105. In some embodiments, the first communication channel is established via one or more network interfaces configured to receive and transmit communications between the workstation 210 and the first network-connectable device 105 (for example, via the first network interface 315, the second network interface 415, a network interface of the first network-connectable device 105, or a combination thereof as described above). In some embodiments, the term "first communication channel" is used to indicate that the workstation 210 and the first network-connectable device 105 may communicate with each other over the network 115. In other words, the first communication channel may be a dedicated communication channel (for example, established using circuit switching) or may be one or more dynamic communication paths utilized during communication using packet switching.

At block 515, the electronic computing device analyzes the first call for a key incident factor. The key incident factor is one or more keywords, identifiers, indicators, and the like within and/or associated with the call that the electronic computing device uses to estimate a call length of the first call (block 520). For example, the key incident factor may be a call source, a location of the first call (in other words, the location of the network-connectable device 105 from which the call is coming from), a type of incident, an incident priority, a number of people involved in an incident, and an estimated time of arrival of a first responding officer (when the incident that the call is related to requires that the call handler stay in the call with the caller until an officer arrives at the caller's location). As mentioned above, more than one key incident factor may be used in the determination of the estimated call length.

The call source corresponds to the type of network-connectable device 105 that the call is coming from. The call source may be an automated alarm, landline, mobile phone, and so on. Calls from a particular type of source may be, on average, longer than calls from other sources. For example, calls from a mobile phone (where the caller is an actual person) will typically be longer than calls from an automated alarm (where the call is electronically generated).

The location of the call may be an exact coordinate and/or a type of area (residential, urban, wilderness, public, private, etc.). The incident type may be a general type of incident and/or a particular incident (for example, one that a call handler has already created an incident record of). The incident priority relates to an urgency of the incident (for example, if the caller is hurt and/or the call handler is required to stay on the line with the caller).

The key incident factor includes at least two different possible types. For example, as mentioned above, when the key incident factor is a call source, the possible types include an automated alarm, landline, mobile phone, and so on. As also explained in some of the examples above, the different possible types of a key incident factor may indicate that the call will be longer or shorter. In other words, different types of a key incident factor are associated with different time factors or weights. For instance, when the key incident factor is the call source, which call source is likely to increase the length of the call compared to other call sources.

In some embodiments, when more than one key factor is used in the determination of the estimated call length, each key incident factor itself (for example, as described above, a call source, a location of the first call, a type of incident, an incident priority, a number of people involved in an incident, and an estimated time of arrival of a first responding officer) is associated with a time factor (or weight) depending on its category (for example, in general, the call source may have less of an impact on the call length compared the impact the type of incident may have. In either case, the time factor or weight for either the category of the key incident factor, the possible type of key incident factor, or both may be set according to a previously received incident calls and the key incident factor(s) associated with them. In other words, the electronic computing device may be configured to analyze one or more previous calls including similar key incident factor types to calculate an estimated time weight based on the average call length between the similar previous calls and associate the time weight with the type of the key incident factor common to the previous calls. The estimated call length may be based on either a summation of the weights of each type of identified key incident factors or a weight associated with the particular combination of types of key incident factors.

For example, the electronic computing device may receive and direct a call to the workstation 210 that relates to an incident type of domestic abuse from 5432. Street Ave. including two people. The electronic computing device may determine the following key incident factors: incident type, incident location, and number of people involved. The electronic computing device may determine that calls with similar incident factors (domestic abuse, residential location type and from the same general area, and involving two people) last "x" minutes on average. Accordingly, the estimated call length may be "x" minutes. Alternatively, the electronic computing device may determine that the command center 110 has received several calls including the same key incident factor(s). Accordingly, the estimated call length may be shorter than the average call length of the calls received regarding the same incident as the caller may not have many additional details to report regarding the incident.

The electronic computing device may receive one or more of the key incident factors directly from information regarding the call entered into an incident record manually via an input device of the workstation 210 by the call handler and/or received directly from the network-connectable device 105. For example, the network-connectable device 105 may transmit, within the metadata of the call, location coordinates of the network-connectable device 105. The electronic computing device may determine, unless additional information determined within the call indicates otherwise, that the location information is the location of a public safety incident. In another example, and as explained above, the caller may be directed to an automated questionnaire, wherein they will be prompted with several questions regarding who they are and the reason for their call. In some embodiments, the electronic computing device is configured to perform one or more techniques in order to determine one or more key incident factors. For example, the electronic computing device may be configured to perform natural language processes and/or optical character recognition to analyze audio and visual and/or text data (respectively) from the call when analyzing the call for a key incident factor. For example, the electronic computing device uses a natural language processing engine to recognize keywords spoken by a caller during a call (for example, "gas leak," "fire," and the like) to determine that the call relates to a particular type of public safety incident.

In some embodiments, the key incident factor may be, when the network-connectable device 105 includes a biometric sensor (for example, when the caller is an officer), a biometric measurement. For example, when the biometric sensor indicates that the caller is hurt and/or stressed (higher heart rate), the call may be longer.

In further embodiments, the one or more key incident factors may also be non-incident related factors. For example, the key incident factor may be a connection strength of the communication channel between the workstation 210 and the first network-connectable device 105. When the connection strength is weak, the data exchange between the workstation 210 and the first network-connectable device 105 may be slow and the audio feed may lag and/or cut out, making it difficult for the call handler to communicate with the caller. Accordingly, it may take the call handler longer to handle such a call. Similarly, the key incident factor may be a background noise level. When there is a lot of background noise within the call (for example, if the caller is calling from a concert or large public event) it again may be difficult for the call handler to communicate with the caller.

In another example, the identity of the caller may be used to determine the length of the call. As explained above, the data feeds of the call may include metadata that includes an identifier that identifies a user of the network-connectable device 105. Additionally, the electronic computing device may identify a caller using voice recognition techniques or using natural language processing to recognize when the caller states his or her name during the call. Based on the identity of the user, the electronic computing device may be able to retrieve information about the caller such as age, gender, address, job information, social media information, and the like. In some embodiments, the electronic computing device accesses one or more local or remotely-located databases to retrieve such information. In some embodiments, the databases are operated by a third-party. For instance, if the particular caller is known to be a repetitive caller, the average length of the calls from the particular caller is used to estimate the call length.

As stated above, the electronic computing device uses the key incident factor(s) to calculate a first estimated call length (block 520). The call length may be a set estimated amount of time (for example, "x" minutes) or a score (for example, a 1-10 scale or a "short, medium, or long" scale). The electronic computing device may continuously adjust the estimated call length as the call handler continues to communicate with the caller, new details regarding the incident are determined, and key incident factors are determined.

At block 525, the electronic computing device determines, based on the first estimated call length, whether to assign a queued call (a call received when no call handlers of the command center 110 are available to handle a call), received at the electronic computing device after the first call, to the first call workstation 210 or to a second call workstation 210. As explained above, the electronic computing device queues the second call, received after the first call, when all workstations 210 of incident-handling call handlers and emergency call-takers are currently engaged in another call and unavailable to handle the second call (the electronic computing device may queue the second call in other situations as well). The electronic computing device compares the estimated call length of the call at the first workstation 210 to the estimated call length of the call(s) the one or more other call handlers at the other workstations 210 in order to determine which workstation is likely to be the next available. The electronic computing device then assigns, based on the estimated call lengths of the calls being handled at the workstations 210, the queued call to either the first call workstation or the second (other) call workstation. In some embodiments, after the electronic computing device assigns the queued call to the queue of a particular workstation, the electronic computing device may continue to re-determine the estimated call length of the two or more workstations 210 when all the call handlers of the workstations are handling calls. The electronic computing device may then reassign the queued call when the electronic computing device determines that the estimated call length of a call being handled at another workstation 210 is shorter that the estimated call length of the workstation 210 that the queued call is assigned to. In other words, the electronic computing device continues to analyze the current calls and reassign queued calls to particular call queues of the workstations 210 such that the queued calls are answered by a call handler as soon as possible.

In some embodiments, the electronic computing device is further configured to analyze the first call after the first call is completed and modify a formula/algorithm used to calculate an estimated call length based on the key incident factor from the first call. For example, the electronic computing device may adjust one or more weights associated with one or more types of key incident factors similar to those of the first call.

It should be understood that while the method 500 is described as being performed in regard to a first, active, call (in other words, a call handler is handling the call), some or all of the method 500 may also be applied to queued calls. For example, the electronic computing device may calculate an estimated call length of a queued call by performing an analysis similar to the one performed at block 515. The electronic computing device may determine a total estimated waiting time based on the estimated call length of the queued call(s) of and an estimated call length of a call being handled at a particular workstation 210 and assign the next received call to the workstation 210 with the shortest wait time.

In some embodiments, the electronic computing device is further configured to assign the queued call a priority based on one or more key factors (for example, a queued call may be given a higher priority when the key incident factors indicate that the call is in regard to an emergency incident and the caller is in urgent need). The priority correlates to a position of the queued call within a call queue of the dispatch workstation. In other words, after the queued call is directed to the queue of the estimated soonest available call workstation 210, depending on the priority, the queued call may be placed as the next call in the queue to be handed.

In some embodiments, the electronic computing device is further configured to notify a dispatch supervisor, for example, via a notification displayed on a network connectable device 105, the monitoring computer 205, and/or the workstation 210, when the number of calls at the queue at the monitoring computer exceeds a predetermined maximum threshold. The dispatch supervisor may then open up additional call handler positions as call handlers may have a targeted time for answering a call upon the call being received. For example, if 10 of 10 call handlers are busy handling calls and the estimated earliest time any call handler can be available (based upon the key incident factors of calls in progress) is more than 15 seconds, then the electronic computing device transmits a notification for the dispatch supervisor to open an additional call handler position.

In some embodiments, the time weights, values, and the thresholds described above are user configurable via an input device of the electronic computing device at the command center 110. In other words, the electronic computing device may be programmed to use one or more common data elements when determining whether the first data feed and the second data feed relate to the same public safety incident. The example point values and thresholds described above are merely examples and other point values and thresholds may be used.

As described above, in some embodiments, the electronic computing device is configured to determine one or more key incident factors by communicating an automated questionnaire to the first network-connectable device 105 before the call is directed to the first workstation 210. In some embodiments, the electronic computing device is configured to include questions in the automated questionnaire based on at least one key incident factor as explained above. As an example, when the call does not include metadata, the electronic computing device controls the automated questionnaire to attempt to obtain general data relating to the key incident factor(s) from the call such that the electronic computing device may be able to ask more specific questions based on the responses to the initial general questions. For example, the automated questionnaire may ask the caller for his or her name or location. In response to receiving such information, the electronic computing device provides more specific questions in the automated questionnaire such as asking about known incidents near the location of the caller as described in the above example.

As another example, based on the location from which the call was received (for example, known by analyzing metadata of the second data feed), the electronic computing device transmits a message to cause the second network-connectable device 105 to audibly output "there are currently two incidents near your location. Press one if you are calling regarding the robbery on 123 Main Street. Press two if you are calling regarding the fire on 100 Main Street. Press three if you are not calling about the previously-described incidents." In addition to or as an alternative to receiving responses to the automated questionnaire via user input of a caller on a keypad or touchscreen, the electronic computing device receives oral responses from the caller and uses a natural language processing engine to determine whether the caller is calling regarding one of the known incidents. In some embodiments, the electronic computing device is configured to provide the automated questionnaire to the second network-connectable device 105 in response to determining at least one of the group consisting of that a quantity of incidents exceeds a predetermined incident quantity threshold, that a quantity of data feeds exceeds a predetermined data feed quantity threshold, that a quantity of data feeds in a data feed queue exceeds a data feed queue threshold, and that an incident severity level exceeds an incident severity level threshold. For example, when the quantity of active incidents being handled by call handlers at the command center 110 exceeds a predetermined incident quantity threshold, the electronic computing device provides the automated questionnaire to one or more network-connectable devices 105 in the queue (for example, the second network-connectable device 105). As another example, when a quantity of data feeds received by the command center 110 (for example, an overall quantity of queued data feeds and data feeds being actively handled by call handlers) exceeds a predetermined data feed quantity threshold, the electronic computing device provides the automated questionnaire to one or more network-connectable devices 105 in the queue. Similarly, as another example, the electronic computing device provides the automated questionnaire to one or more network-connectable devices 105 in the queue in response to determining that a quantity of data feeds in the queue exceeds a data feed queue threshold.

Although most of the above-described examples refer to an audio data feed (voice call) of a first network-connectable device 105, in some embodiments, the electronic computing device receives and analyzes additional data feeds with the call in accordance with the methods described above. In some embodiments, the data feeds include one or more of a video feed, a text feed, an image feed, and a sensor input data feed.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for call queue improvement, the system comprising:
   an electronic computing device communicatively coupled to a first call workstation and a second call workstation, the electronic computing device including an electronic processor configured to
   receive, at the electronic computing device, a first call,
   direct the first call to the first call workstation,
   analyze the first call for a key incident factor,
   calculate a first estimated call length based on the key incident factor, and
   determine, based on the first estimated call length, whether to assign a queued call, received at the electronic computing device after the first call, to the first call workstation or to the second call workstation.

2. The system of claim 1, wherein the electronic processor is further configured to
   compare the first estimated call length to a second estimated call length of a second call directed to the second call workstation, and
   assign, based on the first estimated call length and the second estimated call length, the queued call to either the first call workstation or the second call workstation.

3. The system of claim 1, wherein the key incident factor is at least one selected from the group consisting of a call source, a location of the first call, a type of incident, an incident priority, a number of people involved in an incident, and an estimated time of arrival of a first responding officer.

4. The system of claim 1, wherein the electronic processor is further configured to assign the queued call a priority based on the key incident factor, wherein the priority correlates to a position of the queued call within a call queue of the electronic computing device.

5. The system of claim 1, wherein a time weight associated with the key incident factor is based on call length information from a previously received call.

6. The system of claim 1, wherein the electronic processor is further configured to analyze the first call after the first call is completed and modify a formula used to calculate an estimated call length based on the key incident factor from the first call.

7. An electronic computing device for call queue improvement, the device comprising:
   an electronic processor configured to
   receive a first call,
   direct the first call to a first call workstation,
   analyze the first call for a key incident factor,
   calculate a first estimated call length based on the key incident factor, and
   determine, based on the first estimated call length, whether to assign a queued call, received at the electronic computing device after the first call, to the first call workstation or to a second call workstation.

8. The device of claim 7, wherein the electronic processor is further configured to
   compare the first estimated call length to a second estimated call length of a second call directed to the second call workstation, and
   assign, based on the first estimated call length and the second estimated call length, the queued call to either the first call workstation or the second call workstation.

9. The device of claim 7, wherein the key incident factor is at least one selected from the group consisting of a call source, a location of the first call, a type of incident, an incident priority, a number of people involved in an incident, and an estimated time of arrival of a first responding officer.

10. The device of claim 7, further comprising assigning the queued call a priority based on the key incident factor, wherein the priority correlates to a position of the queued call within a call queue of the electronic computing device.

11. The device of claim 7, wherein a time weight associated with the key incident factor is based on call length information from a previously received call.

12. The device of claim 7, wherein the electronic processor is further configured to analyze the first call after the first call is completed and modify a formula used to calculate an estimated call length based on the key incident factor from the first call.

13. A method for improving call queue management at a dispatch center, the method comprising:
   receiving, at an electronic computing device, a first call;
   directing the first call to a first call workstation;
   analyzing, via an electronic processor of the electronic computing device, the first call for a key incident factor;
   calculating, via the electronic processor, a first estimated call length based on the key incident factor; and
   determining, via the electronic processor and based on the first estimated call length, whether to assign a queued call, received at the electronic computing device after the first call, to the first call workstation or to a second call workstation.

14. The method of claim 13, further comprising:
   comparing the first estimated call length to a second estimated call length of a second call directed to the second call workstation, and
   assigning, based on the first estimated call length and the second estimated call length, the queued call to either the first call workstation or the second call workstation.

15. The method of claim 13, wherein the key incident factor is at least one selected from the group consisting of a call source, a location of the first call, a type of incident, an incident priority, a number of people involved in an incident, and an estimated time of arrival of a first responding officer.

16. The method of claim 13, further comprising assigning the queued call a priority based on the key incident factor, wherein the priority correlates to a position of the queued call within a call queue of the electronic computing device.

17. The method of claim 13, wherein a time weight associated with the key incident factor is based on call length information from a previously received call.

18. The method of claim 13, further comprising analyzing the first call after the first call is completed and modifying a formula used to calculate an estimated call length based on the key incident factor from the first call.

* * * * *